United States Patent
Ricchi

(10) Patent No.: US 12,311,640 B2
(45) Date of Patent: May 27, 2025

(54) VACUUM BAG, APPARATUS AND PROCESS FOR THE PRODUCTION OF LAMINATED GLASS ELEMENTS

(71) Applicant: R.C.N. Solutions S.r.l., Milan (IT)

(72) Inventor: Davide Ricchi, Albairate (IT)

( * ) Notice: Subject to any disclaimer, the term of this patent is extended or adjusted under 35 U.S.C. 154(b) by 187 days.

(21) Appl. No.: 18/038,011

(22) PCT Filed: Nov. 23, 2021

(86) PCT No.: PCT/IB2021/060863
§ 371 (c)(1),
(2) Date: May 20, 2023

(87) PCT Pub. No.: WO2022/112939
PCT Pub. Date: Jun. 2, 2022

(65) Prior Publication Data
US 2024/0001648 A1    Jan. 4, 2024

(30) Foreign Application Priority Data
Nov. 26, 2020    (IT) .................. 102020000028661

(51) Int. Cl.
*B32B 17/10* (2006.01)
*C03C 27/10* (2006.01)

(52) U.S. Cl.
CPC .. *B32B 17/10853* (2013.01); *B32B 17/10036* (2013.01); *B32B 17/10788* (2013.01); *B32B 17/10935* (2013.01); *C03C 27/10* (2013.01)

(58) Field of Classification Search
CPC ........ B32B 17/10853; B32B 17/10036; B32B 17/10788; B32B 17/10935
See application file for complete search history.

(56) References Cited

U.S. PATENT DOCUMENTS

| | | | |
|---|---|---|---|
| 3,912,542 A | 10/1975 | Hirano | |
| 4,180,426 A * | 12/1979 | Oustin | B32B 17/10293 156/286 |
| 4,287,015 A | 9/1981 | Danner, Jr. | |
| 4,425,406 A | 1/1984 | Palma | |
| 4,842,670 A | 6/1989 | Callis | |
| 7,144,464 B2 * | 12/2006 | Teschner | B32B 1/00 156/286 |

FOREIGN PATENT DOCUMENTS

| | | |
|---|---|---|
| EP | 0899245 | 3/1999 |
| FR | 2906496 | 4/2008 |
| JP | H0528674 | 11/1993 |

OTHER PUBLICATIONS

"Cornwall Glass EVA Lamination Process", YouTube, Jul. 19, 2018, www.youtube.com/watch?v=6MNTuOMTYio—Cited in PCT Third Party Observation.

* cited by examiner

*Primary Examiner* — Vishal I Patel
(74) *Attorney, Agent, or Firm* — Themis Law

(57) ABSTRACT

A bag for producing laminated glass elements by vacuuming includes an upper portion and a lower portion, the lower portion being stiffer than the upper portion, which is more resilient. A lamination process that uses such bag is also disclosed.

9 Claims, 3 Drawing Sheets

VACUUM BAG, APPARATUS AND PROCESS FOR THE PRODUCTION OF LAMINATED GLASS ELEMENTS

FIELD OF THE INVENTION

The present invention relates to an apparatus for producing laminated glass elements and the corresponding lamination process.

The present invention also relates to a bag for use in vacuum glass lamination.

BACKGROUND OF THE INVENTION

Laminated glass is known to be composed of at least two glass panes, coupled together at one face, with a bonding material, generally a plastic material, interposed therebetween. Such glass is also known as "compound glass" or "shatter-proof glass".

The interposed plastic material prevents glass from shattering when broken, and allows it to remain intact. In other words, in case of fracture, the laminated glass fragments remain in place due to the action of the bonding material.

Due to this property, laminated glass has quickly become widely popular for its high safety properties. It was initially used for automobile windshields and facades of buildings in geographical areas exposed to hurricanes, as well as in anti-ballistic devices or military devices in general.

Later, this glass has also been appreciated for its characteristics of flexibility and pleasant appearance. A key requirement in current market conditions is to combine exterior appearance, safety, functionality and light weight in various fields, including architecture. Laminated glass meets this requirement.

Furthermore, the possibility of laminating glass panes with the interposition of fabrics, marbles, woods, paper, steel and other materials, has made laminated glass particularly attractive in all fields in which design is a key prerogative.

As is known in the art, the process of producing laminated glass elements, also known as glass lamination, may be carried out under vacuum or under pressure.

Vacuum lamination, which is addressed by the present invention, includes assembling glass panes and sheets of plastic bonding material in alternating relationship. The plastic material is usually polyvinyl butyral (PVB) which behaves as a double-sided adhesive and may be used with or without a bag in autoclave processes, or ethylene vinyl acetate (EVA) which allows production of special laminated glass—as used for example in the manufacture of LEDs and the like, for example glass with decorative LED inserts and/or the like. Then, the semi-finished product is introduced into a special vacuum bag. The bag is connected to at least one vacuum pump via high temperature tubes. The method includes actuating the vacuum pump to create a negative pressure in the bag. Next, heating is started. The lamination process is carried out under these conditions.

Alternatively, a pressure process may be used, in which lamination is carried out in a lamination chamber or autoclave which is hermetically heated at high pressures (about 12 bar).

The production of special laminated glass may combine a vacuum system, using vacuum bags and a pressure autoclave process. Here, ethylene vinyl acetate (EVA) is generally used as a plastic material, and the vacuum bag is introduced into the autoclave. Therefore, the bags of the present invention can also be used in such lamination processes, which can be defined as combined processes, as they also use an autoclave.

In both cases, the laminated product leaving respective lamination chambers has an serious structural and cosmetic defect: an amount of bonding material projects along its entire perimeter, due to leakage during the process.

Thus, this material has to be removed, which requires an additional step in the laminated glass production process, and accordingly has negative effects in terms of manufacturing times and costs.

Furthermore, removal of the leaked material requires cooling down of the article to room temperature, which further extends manufacturing times, or use of special cooling means, resulting in increased costs.

Generally, the edges of the article are cleaned up by a grinding wheel for glass edging or a similar machine tool, or manually by means of a thermal cutter. Both techniques require the use of labor and associated costs and, if machine tools are used, also investment, maintenance and operating costs associated with the machines.

An additional problem of prior art processes is that the projection of leaked material may cause excessive inconsistencies between the nominal thickness and the actual thickness of the assembled laminated glass product. These thickness inconsistencies prevent compliance with applicable standards, namely UNI EN ISO 12543-5 which sets forth dimensions, limit deviations and edge finishes of laminated glass.

No conventional lamination bags or lamination processes of the above described type are free from these drawbacks.

SUMMARY OF THE INVENTION

In view of the above, the purpose of the present invention is to obviate the drawbacks of conventional lamination devices and processes.

In particular, within this purpose, one object of the present invention is to provide a bag for producing laminated glass elements and a lamination process that can eliminate or at least considerably mitigate the problems of the prior art, in particular, concerning leakage of plastic material from the edges of the article during the lamination process.

A further object of the present invention is to provide a bag for producing laminated glass elements and a glass lamination process that are simple, cost-effective and afford a reduction in the times and costs of production of laminated glass elements.

These objects are fulfilled by a process of producing laminated glass elements as defined claim 1, as well as by an apparatus for carrying out such glass lamination process as defined in claim 9, such apparatus comprising a bag as defined in claim 10.

In particular, these objects are fulfilled by a bag for producing laminated glass elements by vacuuming, in which such bag comprises an upper portion and a lower portion and in which the upper portion is more resilient than the lower portion, which is stiffer.

In physics, elasticity is a property that allows a body to deform under the action of an external force and to resume its original shape when the action of the force ceases.

Likewise, as used herein, the elasticity of a portion of bag indicates the ability of such portion to deform under the action of an external force and to resume its original shape when the action of the force causing the deformation ceases.

Therefore, a more resilient portion is a portion that, under exertion of a given force F, deforms to a greater extent DX than the extent dX of deformation of a less resilient, i.e. stiffer portion, under the same force F.

Since the elasticity of a body depends not only on the material of which it is made, namely on the elastic modulus of the material, but also on the geometry of the section on which the force is exerted, reference will be made herein to elasticity to mechanically characterize the bag in relative terms even when the various portions have different thicknesses.

As used herein, a bag generally refers to an enclosure that can be closed on three sides and closably open on one side to allow insertion of the laminated glass elements, but a bag may also refer herein to an enclosure formed by joining together two sheets of material, which are laid one on top and the other under the laminated glass elements and are joined together along the perimeter of the elements and sealed, or to an enclosure formed by multiple sheets of different materials, still joined together at the perimeter of the glass elements and closed. Therefore, bag portions characterized by different elasticity may consist of sheets of equal thicknesses and different materials, or sheets of the same material (therefore having the same elastic modulus) and different thicknesses.

Due to the provision of a bag comprising two portions with different elasticity, during lamination, the more resilient, i.e. more deformable upper portion of the bag, will conform with the profile of the glass element, whereas the less resilient, i.e. less deformable lower portion deforms less or, advantageously, remains substantially undeformed. This will prevent the creation of clearances at the points of contact between the upper and lower portions of the bag in which the bonding material between the glass panes may infiltrate. As a result, this characteristic prevents undesired leakage of polymeric material.

While the present disclosure illustratively provides examples of materials and thicknesses that can be used to make the bag of the present invention, it shall be understood that, depending on process parameters, including the materials used for bonding, the pressure values in the lamination chamber or autoclave and so on, the skilled person can select the elasticity of the lower portion of the bag so that it will remain substantially undeformed during the process, and the upper portion of the bag with a greater elasticity, so that it will deform during the lamination process.

Therefore, the use of a bag of the present invention results in a laminated glass element having clean edges, i.e. free of bonding material that has leaked out during the process, and having a desired shape following application of vacuum and heat, without requiring subsequent cleaning operations. This affords a reduction in process implementation times and, accordingly, in production costs.

Furthermore, the bag of the present invention is simple to use and optimizes process costs since, as mentioned above, it eliminates the step of removing the plastic material projecting along the perimeter of the sheet.

Further characteristics of the preferred embodiments of the bag of the present invention, as described in the present application, are the subject matter of the dependent claims.

The above objects are also fulfilled by a lamination plant comprising at least one lamination bag having the above-mentioned characteristics.

Furthermore, the above objects are also fulfilled by means of a lamination process for producing a laminated glass element comprising the steps of:

pre-assembling an element by superimposing glass panes with one sheet of polymeric material interposed therebetween to form a laminated glass element comprising an upper pane and a lower pane;

providing a vacuum bag comprising at least one upper portion and at least one lower portion having different elasticity;

introducing the pre-assembled laminated glass element into said bag so that the more resilient upper portion of the bag will be placed above said upper pane, and that the less resilient lower portion of the bag will be placed below said lower pane;

connecting together said bag portions having different elasticity at the base of the vertical perimeter edge of the glass panes being laminated;

hermetically closing the bag;

connecting the bag to a vacuum generating system;

generating vacuum inside the bag within the lamination chamber to cause the upper portion of said bag to adhere to the upper surface of the upper pane and to the perimeter side surfaces of such panes of the element;

introducing the bag into the lamination chamber and carrying out the heating cycle for lamination.

Preferably, the vacuum pump is always on until the next bag cooling step, to always ensure the maximum vacuum state inside the bag.

As used herein, a vacuum state refers to a state in which the pressure inside the bag is less than the outside pressure, with an inside-outside pressure difference of about 1 atm.

This bag cooling step is performed in the air so that when the bag reaches a temperature of about 60° C., as measured on its outer surface, the vacuum pump is switched off.

Alternatively, cooling might be performed by means of a special cooling system formed inside the lamination chamber, as is known in the art.

The pump may be optionally equipped with a timer for this purpose.

This process is less time-consuming than prior art processes, as it eliminates the step of removing the plastic bonding material, because the latter, by being effectively sealed by the lower-modulus, i.e. more resilient/easily deformable upper portion of the bag of the present invention, which adheres to the side edges of the element and does not form stagnation pockets as it is constrained by the higher-modulus, i.e. stiffer/less deformable lower portion, is not allowed to escape.

In other words, the technical result achieved thereby, consisting in eliminating the leakage of bonding material along the perimeter of the panes during the lamination process is afforded by the different deformation behaviors, and hence by the difference in elastic modulus, between the upper and lower portions of the bag.

A further technical result achieved by the process of the present invention consists in providing a system that can mechanically prevent the leakage of the plastic bonding material, thereby ensuring that the gap between the effective thickness and the nominal thickness is within the tolerances accepted by the standards, and providing a laminated sheet having a perfect layout.

As used herein, the lower portion and the upper portion of the bag refer to the position of such portions of the bag with respect to the sheet being processed: when the sheet is oriented horizontally, the lower portion is the one at a lower height with respect to the vertical direction, and when the sheet is oriented vertically like, for example in the autoclave process, the terms lower and upper terms no longer refer to the height with respect to the vertical, but only to the sheet: once a lower side and an upper side of the sheet have been identified, the lower and upper bag portions will be those which contact such sides respectively, the principle remaining the same, i.e. having a more deformable bag portion and a stiffer bag portion, the two portions being located at the opposite faces of the sheets being processed. This difference in the deformability of the two portions of the bag causes the lower portion to remain substantially undeformed while the upper portion is deformed. In particular, the upper portion is laid down on the element and adheres to its upper surface and its side edges until it contacts the lower portion, as shown by way of example in FIG. 4.

As used herein, the term "lamination" refers to the operation of superimposing sheets of material to form a compact product formed by the superimposed layers.

In the present description and in the accompanying claims, elasticity or deformability of the bag or of a portion of bag refers to its ability to deform under the action of an external force, so that a more resilient or deformable portion is a portion that, under exertion of a force F, deforms to a greater extent DX than the extent of deformation dX of a less resilient or less deformable, i.e. stiffer portion, under the same force F.

The elastic modulus refers to the longitudinal elastic modulus of the material, i.e. the Young's modulus.

The bag generally refers to a sheet of material or multiple sheet materials. Therefore, bag portions characterized by different elasticity may consist of sheets of equal thicknesses and different materials, or sheets of the same material (therefore having the same elastic modulus) and different thicknesses.

When the bag portion consists of multiple elements, like in the case of the preferred embodiment of the inventive bag as shown herein by way of a non-limiting example of the present invention, its elasticity or elastic modulus refer to the elasticity and the elastic modulus of the entire section.

LIST OF FIGURES

Further characteristics and advantages will be more apparent from the following description of a few preferred, non-limiting embodiments of the bag for producing laminated glass elements and of the corresponding lamination process, which are described by way of example and without limitation with the help of annexed drawings, in which.

DETAILED DESCRIPTION OF THE INVENTION

Figure 1:
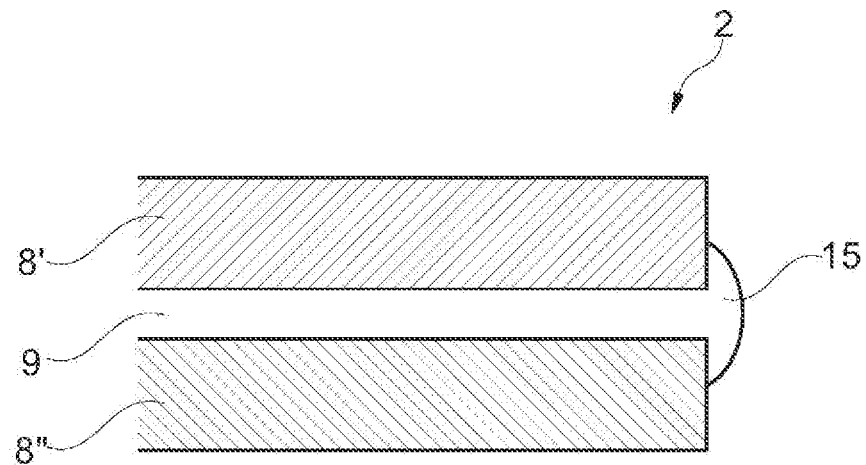
FIG. 1 shows a cross-sectional view of a portion of a laminated glass element obtained with prior art lamination bags.

A bag for producing laminated glass elements according to the present invention, is generally designated by numeral 1.

A laminated glass element is generally designated by numeral 2.

The element 2 comprises at least two glass panes 8', 8" and at least one sheet of a polymeric bonding material 9, which is interposed between said two panes 8', 8".

The bag 1 comprises an upper portion 3 and a lower portion 4. As mentioned above, the upper portion 3 is located above the element 2 and the lower portion 4 below it, during use.

The upper portion 3, during use, is preferably in direct contact with the upper surface 8'a of the upper pane 8' of the element 2, whereas the lower portion 4 is in indirect contact with the lower surface 8"b of the lower pane 8" of the element 2. A Teflon mesh 13 or an equivalent means for assisting air removal inside the bag 1 is preferably interposed between the lower surface 8"b of the element 2 and the lower portion 4 of the bag 1, thereby reducing the friction between the silicone components.

According to the present invention, the upper portion 3 has a greater elasticity than the lower portion 4, so that the upper portion 3 will be more easily deformable than the lower portion 4, which may therefore be deemed to be stiffer and less deformable.

Figure 4:
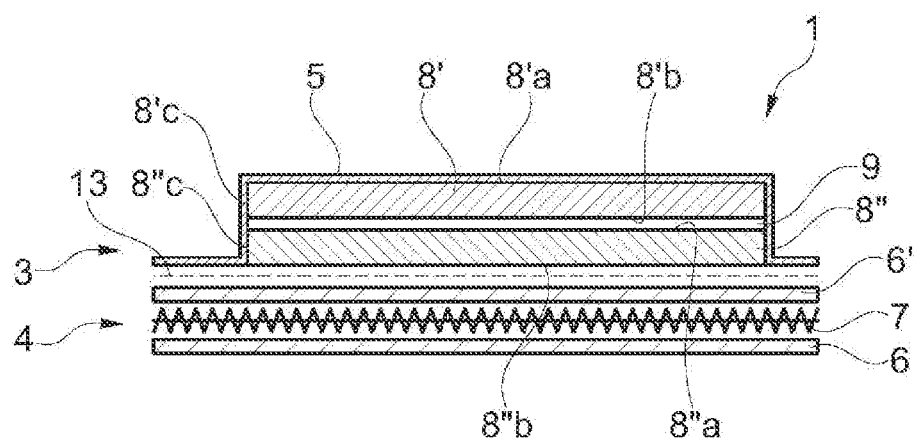
FIG. 4 shows a cross-sectional view of a lamination bag according to one embodiment of the present invention, during a step of the lamination process of the present invention.

As more particularly noted with reference to FIG. 4, according to a preferred embodiment of the present invention, said upper portion 3 is connected to said lower portion 4 of said bag 1 at the base of the vertical perimeter edge 8'c, 8"c of the glass panes 8', 8" being laminated, and this arrangement, in combination with the fact that the lower portion 4 is stiffer than the upper portion 3 of the bag, assists in keeping the upper portion 3 firmly adherent to the vertical perimeter edge 8'c, 8"c of the glass panes being laminated, thereby forming an effective mechanical barrier against the leakage of the polymeric bonding material 9 during the lamination process.

If the upper portion 3 and the lower portion 4 are made of the same material, the different elasticity may be obtained by suitably modifying the thicknesses of the two portions, i.e. by providing a greater thickness for the lower portion and/or the presence of inserts of different material in the lower portion.

Alternatively, the upper portion 3 and the lower portion 4 may be made of different materials, and in this case the two materials may be selected with a suitable elastic modulus to diversify the deformability of the two portions as described herein.

For the purposes of the technical result achieved with the bag of the present invention, the absolute values of elasticity of the two portions that form the bag are not critical, as long as there is a stiffer i.e. less deformable lower portion and an upper portion that is more resilient, i.e. more easily deformable than the first portion.

The product being laminated will comprise an upper pane 8' and a lower pane 8", said upper pane 8' having in turn an upper surface 8'a adapted to be covered by the upper portion 3 of the bag 1, a lower surface 8'b in contact with said polymeric bonding material 9, and a perimeter side surface 8'c, and said lower pane 8" in turn comprises an upper surface 8"a in contact with said polymeric bonding material 9, a lower surface 8"b and a perimeter side surface 8"c.

The deformability of the two portions 3, 4 of the bag must be designed to allow the upper portion 3 of the bag to conform with the upper surface 8'a and the vertical perimeter edge 8'c, 8"c of the glass panes being laminated, thereby affording optimum adhesion of the bag to the perimeter side edge 8'c, 8"c to cover the gap between the two glass panes filled with a plastic material 9, which physically prevents it from leaking out.

As described herein, this allows the upper portion 3 to adhere to the upper surface 8'a of the element 2 and especially to its side edges 8'c, 8"c, thereby preventing the polymeric material 9 from leaking out of its seat during the lamination process, because the upper portion 3 will be caused to deform by adhering to the perimeter edges of the panes without forming those pockets occurring in prior art bags and apparatuses and leading to the formation of excess material as shown in FIG. 1, which illustrates a portion of a laminated glass element 2 obtained with conventional lamination bags.

As easily noted in the figure, the leaking plastic bonding material 9 forms defects 15 that affect the shape and hence the functionality and appearance of the element 2.

Figure 2:
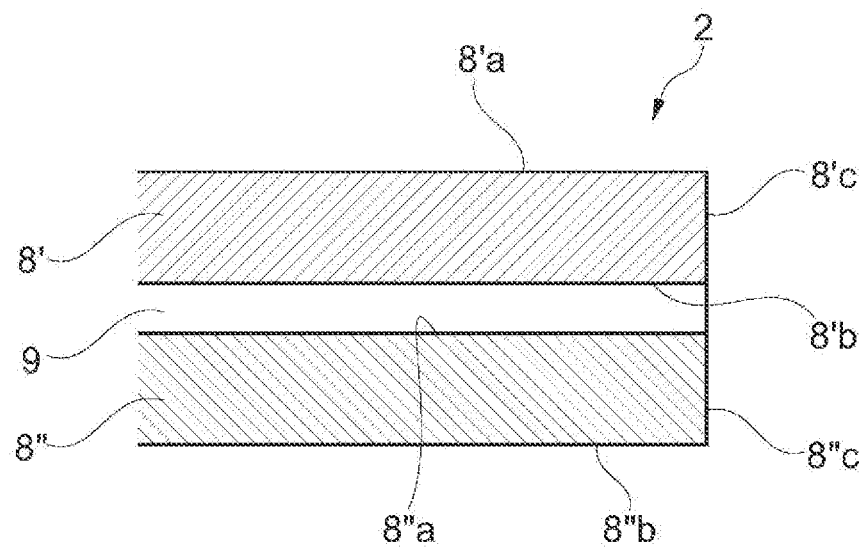
FIG. 2 shows a cross-sectional view of a portion of a laminated glass element obtained with a lamination bag of the present invention.

Conversely, the element 2 obtained with a bag 1 of the present invention does not have such defects 15, as shown in FIG. 2 which illustrates an element 2 immediately after removal from the bag 1 of the present invention.

Furthermore, by avoiding the material leakage of FIG. 1, the bag of the present invention achieves the additional advantage of enabling to reduce the number of layers and/or the thickness of the plastic bonding material between the panes, while complying with the standard requirements for safety laminated glass.

More specifically, with prior art bags, material leakage from perimeter edges occurring as a result of the pane lamination process requires the operator to compensate for the reduced thickness of the plastic material, caused by the material leaking out of the edges of the lamination, by using an additional sheet of plastic bonding material between the panes and/or providing a greater thickness as compared with the thickness that might be used without such material loss.

The thicknesses of the bonding material are dictated by the standards, and for example UNI EN ISO 12543-5 imposes tolerance on the difference between the nominal thickness and the actual thickness as detected after lamination. The leakage of plastic material from the edges occurring with prior art bags and methods requires the amount and/or thickness of each additional plastic bonding sheet to be increased to meet the requirements of UNI 7697:2015 standards (where the minimum thickness of the safety plastic layer for safety glass is 0.76 mm). With the bag of the present invention, the thickness value of the plastic bonding material after lamination, may be equal or very close to the nominal value in the assembled product.

In the example of laminated glass, whose quality is regulated by UNI EN ISO 12543-5, the tolerances on the thickness of the plastic material are +/−0.1 mm. Compliance with the standard requires the use of systems that affect the final quality of the product (e.g. reduction of the vacuum pressure, resulting in air bubbles inside the laminated product), and also affect the exterior appearance result.

Figure 3:
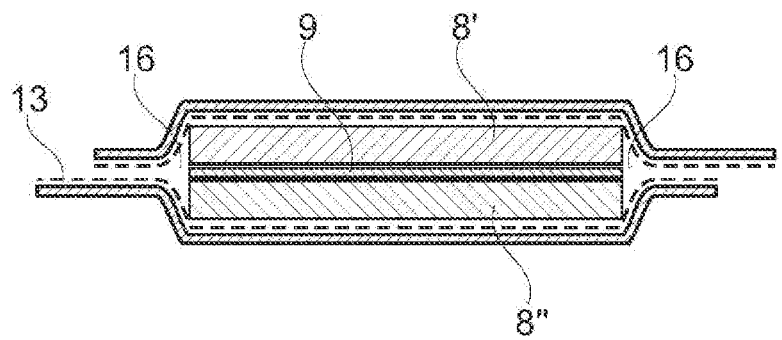
FIG. 3 shows a cross-sectional view of a prior art lamination bag, during a step of a prior art lamination process.

The Applicant found that the problem of the prior art is caused by the the fact that the upper portion 3 and the lower portion 4 of the prior art bag 1 are deformed in the same manner during lamination, because they are substantially identical in prior art bags. Therefore, both tend to adhere to the element 2 under the action of pressure. This generates a symmetrical deformation of the contact zone of the two portions at half the height of the element 2, whereby neither of the two portions adheres to the edges of the element 2 in this contact zone This will form a gap 16 that will be filled with the polymeric material 9 during the lamination process, as shown in FIG. 3, which will lead to the defect 15 of FIG. 1.

Therefore, the Applicant sought to create an asymmetric deformation which would avoid the formation of gaps 16 between the element 2 and the bag 1 during lamination, as shown in FIG. 4.

The Applicant achieved such result by using an upper portion 3 and a lower portion 4 with different deformabilities, i.e. by providing either portions of the same thickness made of materials having different elastic modules, or portions made of the same material, therefore having the same elastic modulus, and having different thicknesses, or by introducing a stiffening element inside the thickness of one of the two elements to make it stiffer than the other element, or by applying a stiffening element at the inner or outer surface of one of the two elements to increase its stiffness as compared with the other element.

Preferably, referring to the embodiment as shown in the accompanying figures, the result is obtained by providing a stiffer lower portion 4 and a more deformable upper portion 3.

This characteristic causes the bag of the present invention to be deformed as shown in FIG. 4.

This deformation causes a good adhesion of the bag 1 on all the side edges of the element 2, as well as on the lower and upper surfaces thereof.

According to an alternative embodiment of the invention, the bag 1 may consist of two portions of equal thicknesses and of different materials, having different mechanical properties. Here, the upper portion 3 will be made of a material that is different from and more resilient than the material that forms the lower portion 4, which is stiffer.

Furthermore, according to a further alternative embodiment of the present invention, the upper 3 and lower 4 portions may be made of the same material and have different thicknesses.

Also, according to a further alternative embodiment of the present invention, the upper 3 and lower 4 portions may be made of the same silicone material but having different silicone hardness (expressed in Shores) and/or different thicknesses of the portions.

Preferably, the upper portion 3 comprises an upper silicone rubber membrane 5 and the lower portion 4 comprises at least a first silicone rubber lower membrane 6.

Advantageously, said upper portion 3 is textured at its inner face which is intended to contact the upper surface 8'a of the upper pane 8'. This particular conformation of the inner face of the upper portion 3 assists air exhaust when removing air and creating vacuum inside the bag, thereby optimizing adhesion of the upper portion 3 of the bag to the upper pane 8' and escape of air during vacuum creation, and the adhesion of the upper portion 3 of the bag to the side faces 8'c, 8"c of the glass panes is also optimized, which will optimize the technical result achieved by the invention in terms of preventing the leakage of the plastic material used for bonding, such as ethylene vinyl acetate (EVA).

As an alternative to silicone rubber, different materials may be used, such as hard Kevlar or the like below, and high temperature PVC or latex above.

Furthermore, as an alternative, the lower portion of the bag, preferably made of silicone may be fixed to the lamination plane, thus stiffening the lower portion of the bag.

Figure 6:
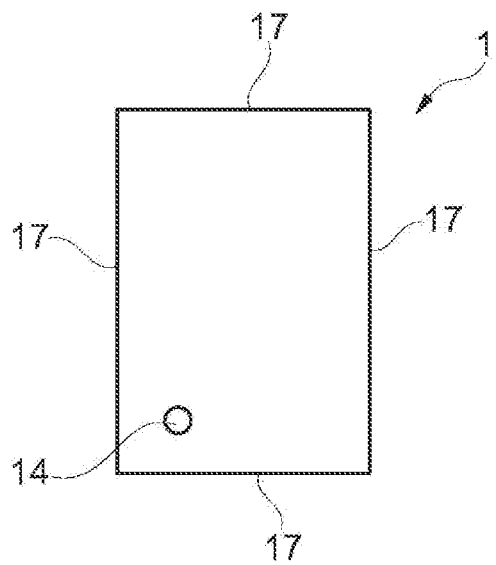
FIG. 6 shows a plan view of the bag of FIG. 5.

Preferably, the upper membrane 5 and the lower membrane 6 both have a rectangular shape and are joined together at least at one side 17 (see FIG. 6). At least one of the four sides 17 of each rectangle, or at least a portion thereof, shall be open to allow insertion of the element 2 to be laminated into the bag 1. However, two independent membranes might be provided, i.e. they may be coupled but not joined together.

According to alternative embodiments, the membranes, and hence the bag 1, might be of any shape and/or size.

Should the lower portion 4 comprise a single lower membrane 6 made of the same material as the upper membrane 5, its thickness would be greater than the thickness of the upper membrane 5.

Figure 5:
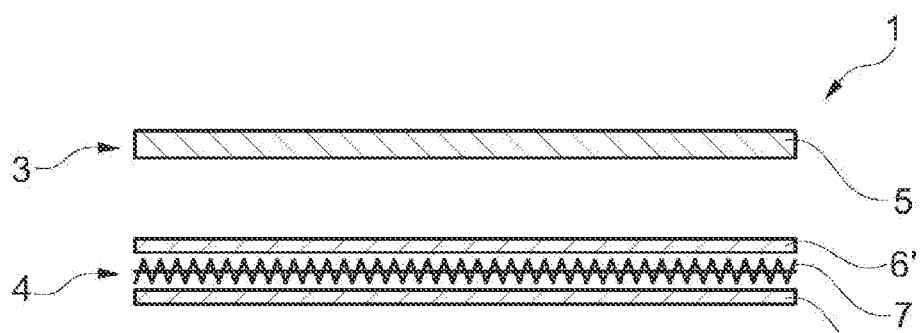
FIG. 5 shows a cross-sectional view of the bag of FIG. 4, when not in use.

As a non-limiting example of the present invention, when the lower portion 4 comprises a single lower membrane 6, the latter may advantageously have a thickness of 1.5 mm to 5 mm, depending on the Shore value, In the most preferred embodiment of the present invention, as shown in FIGS. 4 and 5, the lower portion 4 is not made of a single layer but comprises a first lower membrane 6, a second lower membrane 6' and a stiff element 7 interposed between said first lower membrane 6 and said second lower membrane 6'. The stiff element 7 will have a greater mechanical stiffness as compared with the upper membrane 5 and preferably comprises a metal mesh or panels made of plastic materials such as PVC (polyvinyl chloride), PA (polyamides) or PC (polycarbonate) or the like, which are able to resist high temperatures.

Advantageously, said stiff element 7, whether consisting of a metal mesh or panels of plastic materials, may have thicknesses preferably, but without limitation, ranging from 0.5 mm to 2 mm.

In this preferred embodiment in which the lower portion 4 has a multilayer design, the silicone membranes 6, 6' may advantageously have a thickness ranging from 1 mm to 3 mm.

At least one of the upper portion 3 and the lower portion 4 is formed of one piece.

Advantageously, the upper portion 3 is a single silicone rubber element with a thickness preferably ranging from 0.7 mm to 1.5 mm, depending on the mechanical properties of the material.

The lower portion 4 is preferably formed of one piece and comprises said first lower membrane 6 and second lower membrane 6' and said stiff element 7 interposed therebetween.

Nevertheless, the lower portion 4 may comprise a first lower membrane 6, preferably formed of one piece with the upper membrane 5, and a removable stiffening means comprising at least one stiff element 7 disposed (i.e. bonded) at the top or on the bottom of the first lower membrane 6.

Preferably, said stiffening means also comprises a second lower membrane 6', placed on top of the stiff element 7 so that the glass element 2 will rest thereon during lamination and be thus more protected.

The bag 1 can be opened to receive the element 2 and can be hermetically closed to allow vacuum generation therein and has closure means for this purpose.

According to preferred embodiments of the present invention, the upper portion 3 and the lower portion 4 can be coupled by means of said closure means which, in the closed position, hermetically close the bag 1. These closure means are arranged at the open sides 17 of the bag 1, hence at least at one side 17 of the bag 1, but they can be arranged along two or three sides 17 or along its entire perimeter.

Figure 7:
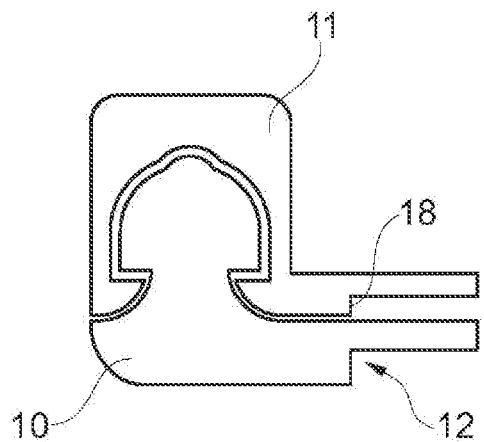
FIG. 7 shows a cross-sectional view of a system for closing the bag of the present invention.

The closure means comprise a male closure means 10 which is fixed to one of said upper portion 3 and said lower portion 4 and a corresponding female closure means 11 which is fixed to the other of said upper portion 3 and said lower portion 4. In the embodiment of FIG. 7, the male closure means 10 is fixed to the lower portion 4 and the female closure means 11 is fixed to the upper portion 3.

According to the present invention, the closure means fixed to the lower portion 4 has a groove 12 which is designed to fix it level with a lower membrane 6, 6' and with the stiff element 7, as shown in FIG. 7.

In this cross-sectional figure, said groove 12 is schematically represented by a step located at the base of the male closure means. The female closure means 11 in turn comprises a groove 18 for fixation to the upper membrane 5.

The closure means are formed by extrusion. They are also fixed to their respective upper portion 3 and lower portion 4 by curing.

Alternatively, the closure means may be of different type and may be applied to the bag 1 with different methods.

The bag 1 is also equipped with at least one valve 14 for generating vacuum therein.

The bag 1 is highly versatile, as it can be applied to new or existing lamination plants of any brand and model. The dimensions of the bag 1 and the layout will depend on user requirements. Nevertheless, most frequent applications will use silicone membranes with thicknesses ranging from 0.5 mm to 5 mm, advantageously with a thickness of 0.7 mm for the upper portion and 1.5 mm for each of the lower membranes 6, 6', a mesh of about 1 mm, summing up to a total thickness of preferably about 5 mm.

The present invention also relates to a lamination plant having such a bag 1. In particular, a lamination plant of the present invention comprises at least one lamination chamber, preferably having at least one horizontal base plate on which at least one bag 1 is laid, as described above. The plant is also equipped with vacuum-generating means and associated suction tubes connected with the bag 1, as well as means for heating the lamination chamber and hence the bag 1.

A lamination process for producing of a laminated glass element 2 according to the present invention will be now described.

This process comprises a first step of pre-assembling an element 2 by superimposing glass panes 8 with at least one sheet of polymeric material 9 interposed therebetween.

The polymeric material 9 may comprise polyvinyl butyral (PVB), ethylene vinyl acetate (EVA), thermoplastic polyurethane (TPU), or any other polymer having good properties in terms of adhesion, stability, filtration and thermomechanics.

The pre-assembled element 2 is then introduced into a bag 1 as described above, preferably placed on a Teflon reinforcing mesh 13 laid on the lower portion 4 of said bag 1.

Advantageously, the pre-assembled element 2 is introduced into said bag 1 with its upper pane 8' at the top and its lower pane 8" at the bottom, so that the upper portion 3 of said bag 1 will contact the upper surface 8'*a* of said upper pane 8' and said edges and said lower portion 4 of said bag 1 will contact the lower surface 8"*b* of said lower pane 8".

The bag 1 was previously placed on a horizontal pull-out base plate contained inside a lamination chamber.

Then, the process of the invention includes hermetically closing the bag 1 by coupling the aforementioned male closure means 10 with the female closure means 11 by press-fit or interlocking.

Vacuum is then generated inside the bag 1 by a vacuum pump connected to the bag 1 via the valve 14 and a suction tube. Vacuum is created so that the upper portion 3 will conform with the profile of the element 2 by adhering to its upper surface and to its lateral edges.

In other words, during lamination, the lower portion 4 retains its shape while the upper portion 3, due to the pressure difference between the vacuum generated inside the bag 1 and the external atmospheric pressure, will conform with the shape of the element 2 and seal its perimeter edges, thereby preventing any leakage of polymeric material 9.

It will be appreciated from the above description that the bag 1 for producing laminated glass elements 2 as well as the lamination process fulfill the intended purpose and objects.

It should be noted that the bag 1 and the process that have been described herein in the context of glass lamination might also be used for lamination of similar materials, such as ceramics, metal, wood, marble, plastics and the like.

It shall be understood that the bag 1 and the lamination process thus conceived are susceptible of many changes and variations within the scope of the invention. Furthermore, all the details may be replaced by technically equivalent parts. The materials in use, as well as the contingent dimensions and shapes, may be vary according to requirements and to the state of the art.

The invention claimed is:

1. A lamination process for producing a laminated glass element (2), comprising the steps of:
    pre-assembling the laminated glass element (2) by superimposing glass panes (8', 8") with one sheet of polymeric material (9) interposed therebetween to form a pre-assembled laminated glass element (2) comprising an upper pane (8') and a lower pane (8");
    providing a vacuum bag (1) comprising an upper portion (3) and a lower portion (4) having different elasticities, the upper portion being more resilient and the lower portion being less resilient;
    introducing the pre-assembled laminated glass element (2) into said vacuum bag (1) so that the more resilient upper portion (3) of the vacuum bag (1) will be placed above said upper pane (1), and the less resilient lower portion (4) of the vacuum bag (1) will be placed below said lower pane (8");
    connecting together said upper and lower portions (3, 4) of the vacuum bag having different elasticities at a base of a vertical perimeter edge (8'c, 8"c) of the glass panes (8', 8") being laminated;
    hermetically closing the vacuum bag (1);
    connecting the vacuum bag to a vacuum generating system;
    generating vacuum inside the vacuum bag (1) within a lamination chamber to cause the upper portion (3) of said vacuum bag to adhere (1) to the upper surface (8'a) of the upper pane (8') and to perimetric side surfaces (8'c, 8"c) of said upper and lower panes (8', 8"); and
    introducing the vacuum bag into the lamination chamber and carrying out a heating cycle for lamination, thus providing the laminated glass element (2) with no leakage of bonding material from perimeter edges (8'c, 8"c) of the upper and lower panes (8', 8").

2. The lamination process as claimed in claim 1, further comprising the steps of:
    before introducing the pre-assembled laminated glass element (2) into said vacuum bag (1), manually cleaning the perimeter edges (8'c, 8"c) of the upper and lower panes (8', 8") from excess bonding material (9); and
    applying a high temperature adhesive tape on all the perimeter edges (8'c, 8"c), to protect the vacuum bag (1) from contact with the polymeric material and to assist in obtaining polished perimeter edges (8'c, 8"c) with no leaked bonding material.

3. The lamination process as claimed in claim 1, wherein said upper portion (3) and said lower portion (4) of said vacuum bag (1) are made of a same material but have different thicknesses, the lower portion (4) being thicker than the upper portion (3).

4. The lamination process as claimed in claim 1, wherein said upper portion (3) and said lower portion (4) of said vacuum bag (1) are made of a same silicone material but with different silicone hardnesses and/or different thicknesses of the upper and lower portions.

5. The lamination process as claimed in claim 1, wherein said upper portion (3) comprises an upper membrane (5) made of silicone rubber and the lower portion (4) comprises at least one first lower membrane (6) made of silicone rubber, aramid, PVC, or latex.

6. The lamination process as claimed in claim 1, wherein said lower portion (4) of said vacuum bag (1) comprises a first lower membrane (6), a second lower membrane (6'), and a stiff element (7) interposed between said first lower membrane (6) and said second lower membrane (6'), the stiff element being characterized by a higher rigidity than the upper and lower membranes.

7. The lamination process as claimed in claim 6, wherein said stiff element (7) comprises a metal mesh or panels made of plastic materials.

8. The lamination process as claimed in claim 6, wherein the stiff element (7) is associated with said lower portion (4) of said vacuum bag (1).

9. The lamination process as claimed claim 6, wherein said lower portion (4) is formed as a single piece which comprises the first lower membrane (6), the second lower membrane (6'), and the stiff element (7) interposed therebetween.

* * * * *